(12) United States Patent
Udriste et al.

(10) Patent No.: US 10,683,093 B2
(45) Date of Patent: Jun. 16, 2020

(54) PASSENGER SEAT HAVING SIDE SLEEP SUPPORT ASSEMBLY

(71) Applicant: B/E Aerospace, Inc., Wellington, FL (US)

(72) Inventors: Daniel I. Udriste, Coral Springs, FL (US); Catalin Bunea, Miramar, FL (US); Bobby W. Lawson, Walnut Cove, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 199 days.

(21) Appl. No.: 15/716,693

(22) Filed: Sep. 27, 2017

(65) Prior Publication Data

US 2018/0105274 A1 Apr. 19, 2018

Related U.S. Application Data

(60) Provisional application No. 62/410,019, filed on Oct. 19, 2016.

(51) Int. Cl.
*B60N 2/34* (2006.01)
*B64D 11/06* (2006.01)

(52) U.S. Cl.
CPC .......... *B64D 11/0641* (2014.12); *B60N 2/34* (2013.01); *B64D 11/0642* (2014.12); *B64D 11/0643* (2014.12); *B64D 11/0647* (2014.12)

(58) Field of Classification Search
CPC .......... B60N 2/34; B60N 2/665; B60N 2/667; B60N 2/6673; B60N 2/686; B60N 2/7011; B64D 11/0604; B64D 11/0607; B64D 11/0641; B64D 11/0647; B64D 11/06395; B64D 2011/0069; B64D 2011/0076

See application file for complete search history.

(56) References Cited

U.S. PATENT DOCUMENTS 4,702,522 A * 10/1987 Vail ........................ A47C 7/18
297/284.2
4,869,554 A * 9/1989 Abu-Isa .................. A47C 7/282
297/452.56

(Continued)

FOREIGN PATENT DOCUMENTS

DE 102004029062 B3 * 9/2005 .......... B60N 2/5657
EP 1688119 A1 * 8/2006 ............. A61H 23/02

(Continued)

*Primary Examiner* — Ryan D Kwiecinski
(74) *Attorney, Agent, or Firm* — Clements Bernard Walker

(57) ABSTRACT

An aircraft passenger seat configured to facilitate ergonomic alignment of a passenger while in a sleeping position, including a seat bottom; and a seatback including a central opening corresponding to a shoulder region of a passenger, and a sleep support assembly mounted within the central opening, the sleep support assembly including an adjustable support member spanning a central portion of the seatback, where the adjustable support member is configured for at least one of translation and deformation; where, when the seat bottom is aligned with the seatback in a lie-flat seating position, a load provided by the shoulder region of the passenger, at least in a side-sleeping position, causes translation and/or deformation of the adjustable support member toward a floor of an aircraft cabin, thereby facilitating ergonomic alignment of the spine.

19 Claims, 12 Drawing Sheets

(56) References Cited

U.S. PATENT DOCUMENTS

| | | | | |
|---|---|---|---|---|
| 5,076,643 A * | 12/1991 | Colasanti | ............... | A47C 7/467 297/284.6 |
| 5,868,466 A * | 2/1999 | Massara | ................ | A47C 7/467 297/284.6 |
| 6,203,105 B1 * | 3/2001 | Rhodes, Jr. | ............... | A47C 4/54 297/284.6 |
| 7,481,493 B2 * | 1/2009 | Fujita | ...................... | A47C 7/28 297/284.2 |
| 8,783,771 B2 * | 7/2014 | Oleson | ................... | B64D 11/06 297/216.15 |
| 9,199,560 B2 * | 12/2015 | Line | ........................ | A47C 7/22 |
| 2008/0150342 A1 * | 6/2008 | Kismarton | ............ | B64D 11/06 297/452.18 |
| 2008/0309132 A1 * | 12/2008 | Katsuta | ................. | A61H 23/02 297/217.3 |
| 2010/0201178 A1 * | 8/2010 | Mizobata | ............. | B60N 2/5825 297/452.35 |
| 2010/0207443 A1 * | 8/2010 | Brncick | ................. | B60N 2/686 297/452.48 |
| 2011/0233980 A1 * | 9/2011 | Hoshi | ................... | B60N 2/0232 297/354.1 |
| 2011/0278886 A1 * | 11/2011 | Nitsuma | ............... | B60N 2/4228 297/216.13 |
| 2014/0300145 A1 * | 10/2014 | Beroth | ................... | B60N 2/995 297/83 |
| 2014/0300171 A1 * | 10/2014 | Velasco | ................. | B64D 11/06 297/452.18 |
| 2015/0283927 A1 * | 10/2015 | Velasco | ............. | B64D 11/0646 297/391 |
| 2018/0208080 A1 * | 7/2018 | Hirayama | ............ | B60N 2/0224 |

FOREIGN PATENT DOCUMENTS

FR         3001711 A1 *   8/2014   ........... B60N 2/4249
JP         07148047 A *   6/1995   ............. B60N 2/646

* cited by examiner

PASSENGER SEAT HAVING SIDE SLEEP SUPPORT ASSEMBLY

RELATED APPLICATIONS

This application claims priority to U.S. Provisional Patent Application Ser. No. 62/410,019, entitled "PASSENGER SEAT HAVING INTEGRATED SIDE SLEEP SUPPORT COMFORT SYSTEM," filed Oct. 19, 2016. This application is related to the following prior patent application by B/E Aerospace directed to aircraft passenger seats: U.S. patent application Ser. No. 14/537,224, entitled "Aircraft Seat with Taxi, Takeoff and Landing Lie Flat Capability," filed Nov. 10, 2014. All above identified applications are hereby incorporated by reference in their entireties.

BACKGROUND

The present invention relates generally to a passenger seat with enhanced comfort to facilitate side sleeping, and more particularly, to a lay-flat passenger seat including a seatback having an integrated side sleep support assembly configured to adjust inward deflection in the seatback when the seat is occupied in a sleeping configuration.

Passenger seats found aboard commercial airliners and other conveyances can be configured to recline during flight for enhanced comfort and to alleviate fatigue. While economy class seats typically include a static seat bottom and reclining seatback, premium class seats typically include an adjustable seat bottom, seatback and legrest. In the upright sitting position required for taxi, takeoff and landing, the seat bottom can be at a shallow angle to horizontal, the seatback near vertical, and the legrest stowed in a generally vertical orientation against the front of the seat bottom. During flight, the seating components of lie-flat capable seats can adjust such that the top surfaces thereof reside in a common plane to form a continuous flat bed. A seat can additionally include a headrest that can form part of the bed.

Regardless of seating class, seat bottoms, seatbacks and legrests are typically constructed with a frame, cushion and upholstery. The frame provides rigid structural support, the cushion provides comfort and dampens impact, and the upholstery conceals and protects the cushion and frame and additionally provides seat aesthetics.

Regardless of frame and cushion type, conventional seats typically have uniform deflection across the width and/or height of the seatback. In other words, the degree of achievable deflection in the seatback is predetermined, non-adjustable, and constant across the full width and/or height of the seatback. While such construction may be comfortable when the seat occupant lays flat on their back, such construction is uncomfortable in a side sleeping position due to misalignment of a spine of the passenger with the planar bed surface.

As such, what is needed is a seatback that allows additional deflection in predetermined areas to facilitate a comfortable side sleeping position. It is further desirable to provide adjustable deflection in predetermined areas of the seatback for greater overall seat adjustability and to accommodate passengers of different sizes, builds and weights. Deflection adjustability can be practiced in the seatback as well as other seat components including, but not limited to, the seat bottom, legrest and headrest.

SUMMARY OF ILLUSTRATIVE EMBODIMENTS

The above and other objects of the invention are achieved in the embodiments described herein directed to a passenger seat configured to facilitate a side sleeping position generally including a seatback having an integrated side sleep support assembly, and a controller configured to control the shape and/or density of the side sleep support assembly.

In one aspect, an aircraft passenger seat can be configured to facilitate ergonomic alignment of a passenger while in a sleeping position, including a seat bottom; and a seatback including a central opening corresponding to a shoulder region of a passenger, and a sleep support assembly mounted within the central opening, the sleep support assembly including an adjustable support member spanning a central portion of the seatback, where the adjustable support member is configured for at least one of translation and deformation; where, when the seat bottom is aligned with the seatback in a lie-flat seating position, a load provided by the shoulder region of the passenger, at least in a side-sleeping position, causes translation and/or deformation of the adjustable support member toward a floor of an aircraft cabin, thereby facilitating ergonomic alignment of the spine.

In some implementations, the adjustable support member includes a flexible diaphragm spanning a central portion of the sleep support assembly, and a plurality of fasteners applying tension to the flexible diaphragm in at least one of a latitudinal direction and a longitudinal direction of the seatback.

In some implementations, the adjustable support member includes at least one actuator, each actuator of the at least one actuator configured to cause adjustment of one or more of the plurality of fasteners.

In some implementations, the one of the plurality of fasteners is a dielectric elastomer actuator of the at least one actuator, where activation of the dielectric elastomer actuator by the controller causes alteration of a contour of at least one of the adjustable support member and a passenger-facing surface of the seatback.

In some implementations, the sleep support assembly includes an air bladder configured to inflate, thereby modifying a contour of at least one of the adjustable support member and a passenger-facing surface of the seatback.

In some implementations, the sleep support assembly includes at least one support configured to support a spine of the passenger when the passenger is in a back sleeping position.

In some implementations, the sleep support assembly includes at least one support configured to support a spine of the passenger when the passenger is in a side sleeping position.

In some implementations, the adjustable support member includes a horizontally moving panel connected to the seatback with a plurality of adjustable shocks.

In another aspect, greater inward deflection is achievable in a region of the side support assembly as compared to surrounding areas of the seatback.

In some implementations, the side support assembly includes a controller configured to cause adjustment of at least one of the plurality of fasteners through signals issued to the at least one actuator; and where, when the seat bottom is aligned with the seatback in a lie-flat seating position, the controller is configured to control shape and/or density of the side support assembly through actuation of the one or more actuators for supporting ergonomic alignment of a spine of the passenger.

In some implementations, the sleep support assembly includes at least one pressure sensor configured to detect an amount of pressure the passenger is placing on one or more regions of the seatback; and where the controller is configured to adjust the plurality of fasteners based on signals received from the at least one pressure sensor.

In some implementations, the passenger seat further includes an adjustable headrest, where the at least one pressure sensor further includes a headrest-mounted pressure sensor configured to detect an amount of pressure a head of the passenger is placing on the headrest; and the controller is configured to adjust the headrest based on signals received from the headrest-mounted pressure sensor.

In an aspect, the side sleep support assembly and headrest can cooperate to align the spine in straight-line parallel alignment with the top surface of the bed when the seat is occupied in a sleeping configuration.

In one aspect, the passenger seat further includes a cushion assembly disposed between a portion of a passenger-facing surface of the seatback and the side support assembly.

A system for facilitating ergonomic positioning of a passenger in a lie-flat position of a passenger seat, the system including a passenger seat including a seat bottom, and a seatback including a central opening corresponding to a shoulder region of a passenger, and a sleep support assembly mounted within the central opening, the sleep support assembly including an adjustable support member spanning a central portion of the seatback, where the adjustable support member is configured for at least one of translation and deformation, where, when the seat bottom is aligned with the seatback in a lie-flat seating position, a load provided by the shoulder region of the passenger, at least in a side-sleeping position, causes translation and/or deformation of the adjustable support member toward a floor of an aircraft cabin, thereby facilitating ergonomic alignment of the spine; at least one actuator configured to cause at least one of translation and deformation of the adjustable support member; and a controller including circuitry configured to receive at least one of a user setting and sensor data, and responsive to the at least one of the user setting and the sensor data, control one or more actuators of the at least one actuator to adjust at least adjustable support member.

In some implementations, the sleep support assembly includes at least one pressure sensor configured to detect pressure the passenger applies to one or more regions of a seat back of the passenger seat; receiving the at least one of the user setting and the sensor data includes receiving signals from the at least one pressure sensor; and the controller is configured to adjust the plurality of fasteners based on signals received from the at least one pressure sensor.

In some implementations, the controller is further configured to, based on the signals from the at least one pressure sensor, determine a sleeping position of the passenger, where controlling the one or more actuators includes adjusting the at least one support to support ergonomic alignment of a spine of the passenger in the sleeping position.

In some implementations, the system further includes a user interface including a plurality of user-selectable controls, where receiving the at least one of the user setting and the sensor data includes receiving a user setting of the plurality of user-selectable controls of the user interface.

In some implementations, the adjustable support member includes a horizontally moving panel connected across the central portion of the seatback using a plurality of adjustable shocks positioned between the horizontally moving panel and a passenger-facing surface of the seatback.

In some implementations, the adjustable support member includes a flexible fabric stretched taut across the central portion of the seatback.

In some implementations, the side support assembly further includes a plurality of fasteners connected along opposing sides of the adjustable support member for connecting the adjustable support member to the seatback, where the adjustable support member is generally rectangular in shape.

Embodiments of the invention can include one or more or any combination of the above features and configurations.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1A:
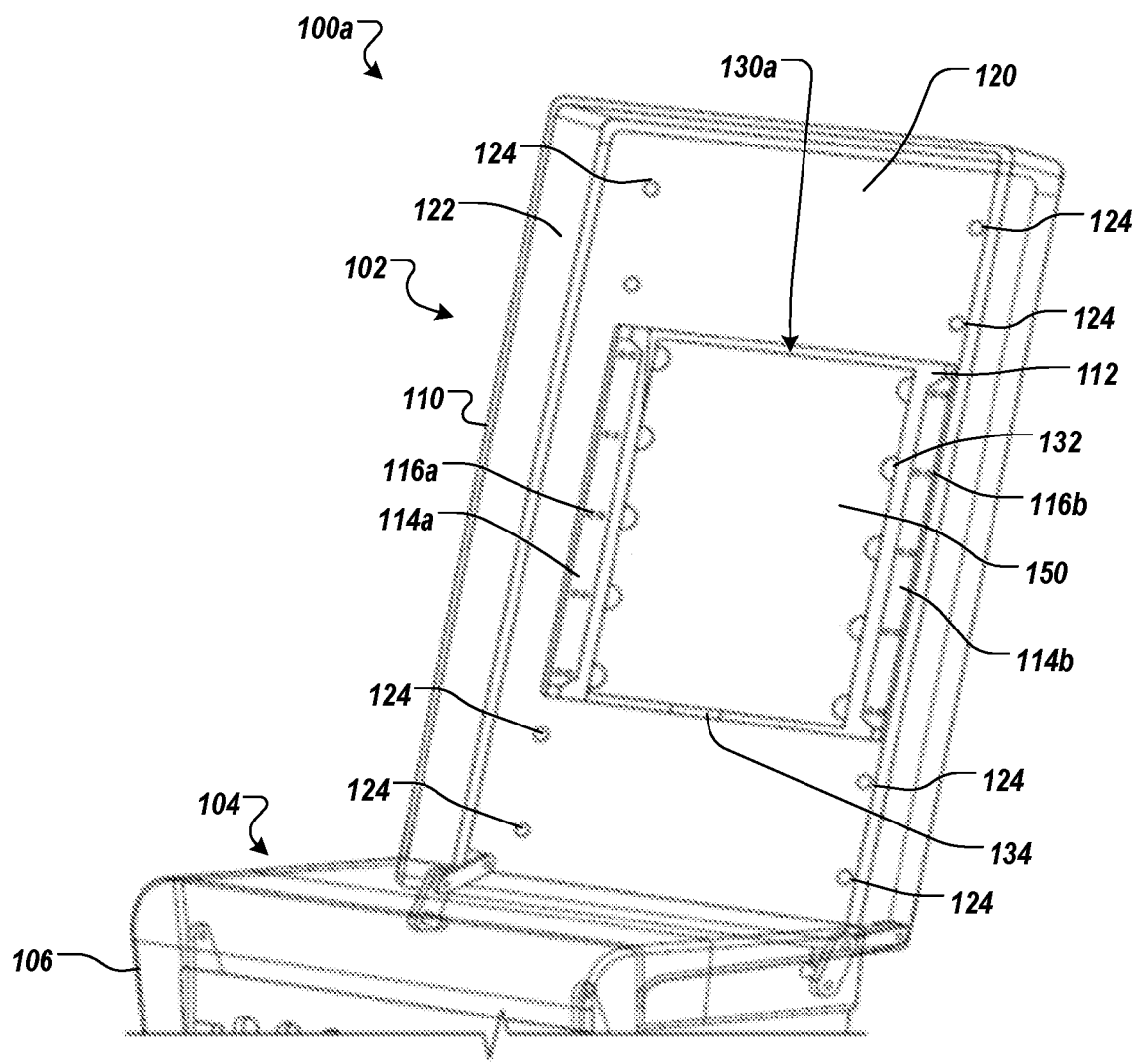
FIG. 1A is a perspective view of a seat including a seatback having a recess and a side sleep support assembly including a flexible diaphragm integrated into the recess of the seatback according to an example.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Figure 1B:
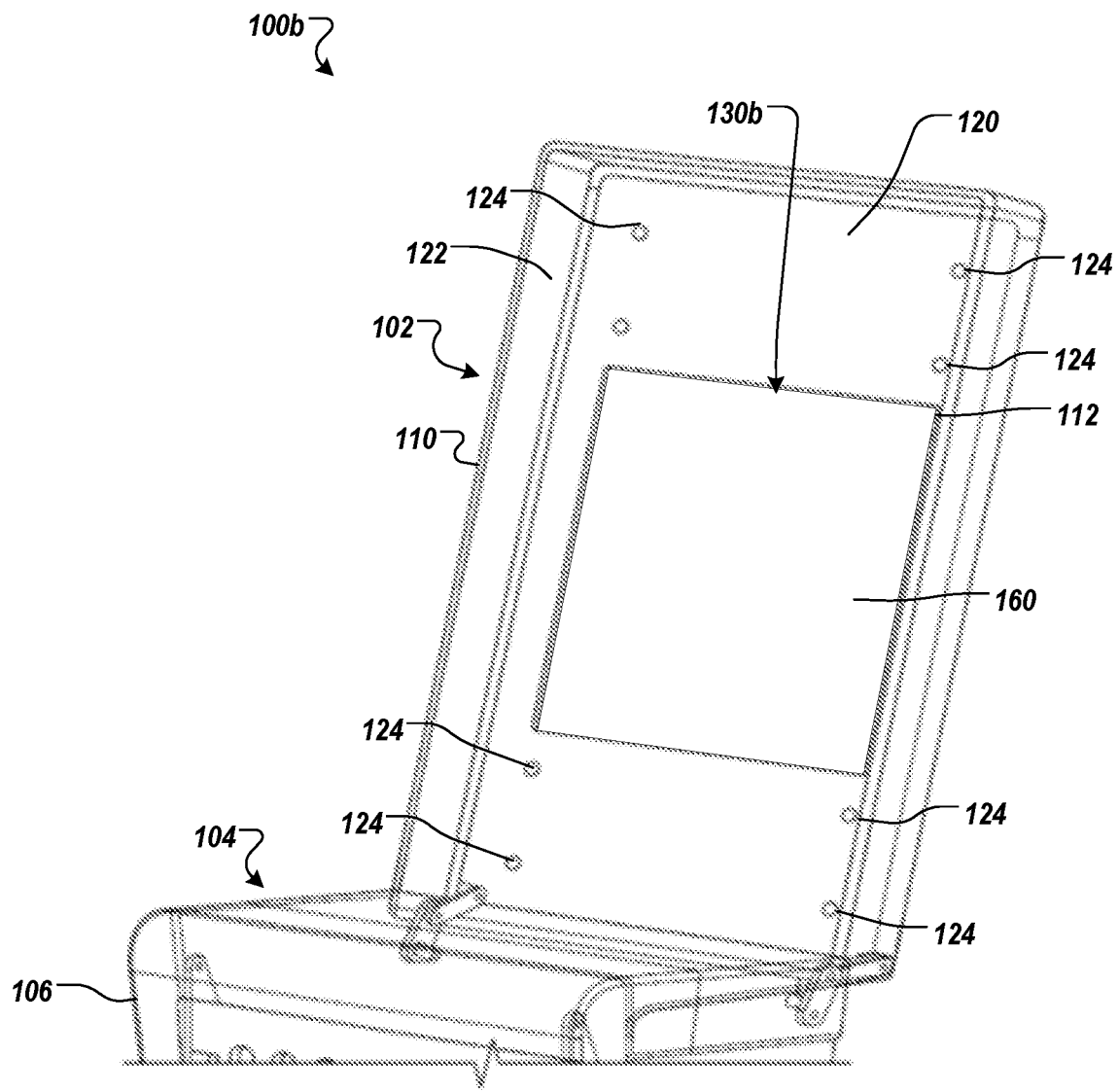
FIG. 1B is a perspective view of a seat including a seatback having a recess and a side sleep support assembly including a horizontally moving panel integrated into the recess of the seatback according to an example.
Figure 1C:
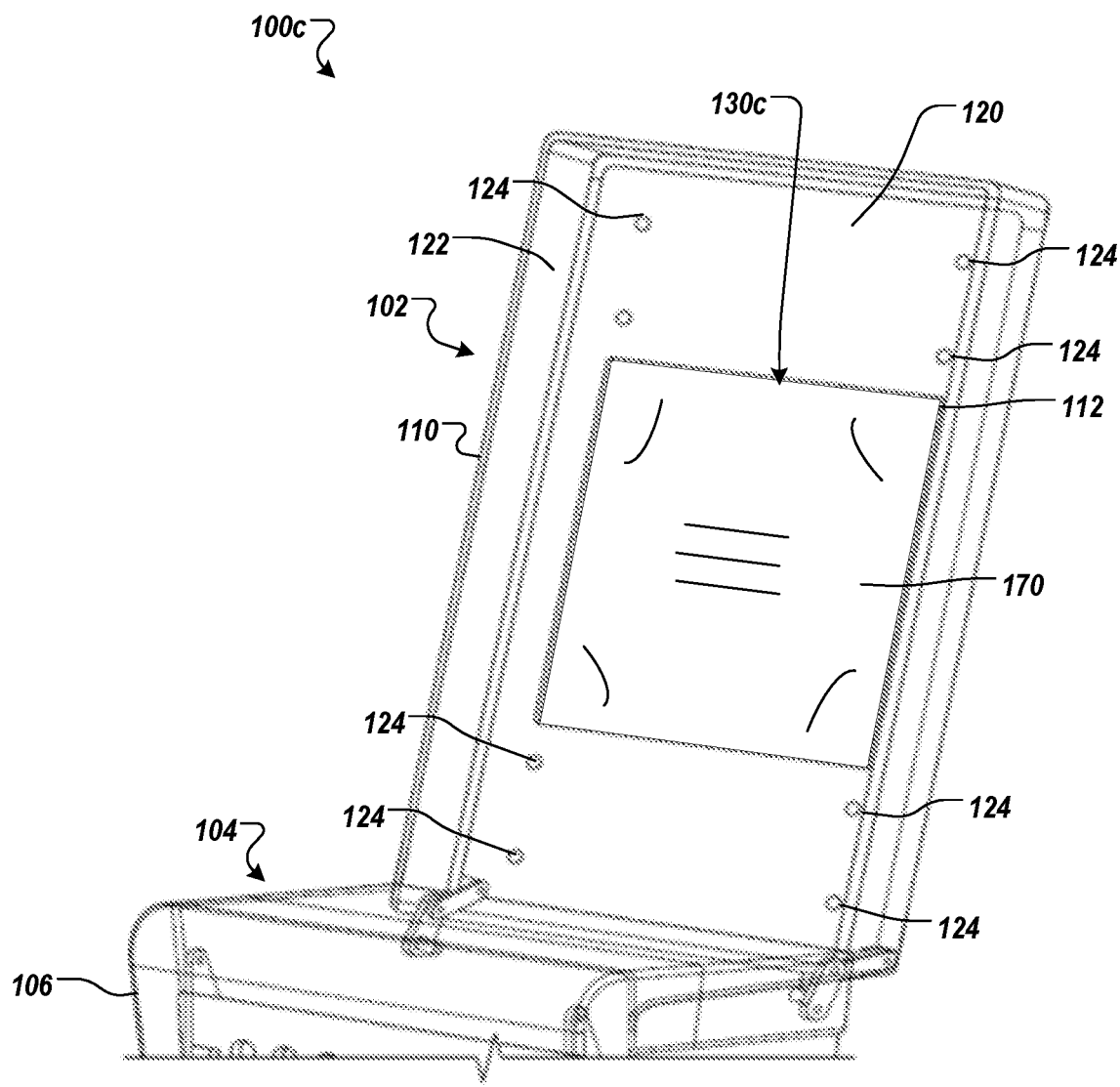
FIG. 1C is a perspective view of a seat including a seatback having a recess and a side sleep support assembly including an adjustable support integrated into the recess of the seatback according to an example.

Referring now to the drawings, FIGS. 1A-1C show a portion of a seat 100a-c generally including a seatback 102 having a recess 112 in about a center of the seatback 102, a side sleep support assembly 130a-c configured to fit within the recess 112, a seat bottom 104 connected to the seatback 102, and a legrest 106 connected to the seat bottom 104. Each of the seatback 102, the seat bottom 104, and the legrest 106 can be constructed from at least a frame element, a cushion element, and an upholstery element, where any two or more of the elements can be separate or integrally formed.

In an example, the seatback 102 includes a seatback frame 110 which as shown is a generally planar, rigid member that provides structural support and dictates a vertical and lateral extents of the seatback 102. The seatback 102 can include a back portion 120 surrounded by a frame edge 122 configured to receive a cushion system (see FIG. 3). In an example, the cushion system can be secured to the back portion 120 at a number of securing locations 124. In some implementations, the recess 112 is provided in about a center of the back portion 120 of the seatback frame 110 in order to accommodate the side sleep support assembly 130 therein.

In some implementations, a seat 100a-c can include a side sleep support assembly 130a-c that can be configured to generate a comfortable side sleeping position in several ways. In an example embodiment, a side sleep support assembly 130a can include a flexible diaphragm 150 integrated into the recess 112 of the seatback 102 (FIGS. 1A, 2A-2C). In an example embodiment, a side sleep support assembly 130b can include a horizontally moving panel 160 integrated into the recess 112 of the seatback 102 (FIGS. 1B, 2D). In an example embodiment, a side sleep support assembly 130c can include an adjustable support 170 integrated into the recess 112 of the seatback 102 (FIGS. 1C, 2E-2F).

In one aspect, each side sleep support assembly 130a-c allows greater deflection inward into the seatback 102 as compared to the surrounding areas of the seatback 102 outside of the side sleep support assembly 130a-c. Positioning the side sleep support assembly 130a-c inward of the vertical and lateral extents of the seatback 102 allows additional, controllable deflection in the middle or center area of the seatback 102 when the seatback 102 is, for example, in a sleeping configuration with an occupant lying on their side (see FIG. 3).

In some implementations, the side sleep support assembly 130a-c is integrated into the seatback 102 to generally facilitate a comfortable side sleeping position, for example, when the seat 100 is occupied in a sleeping configuration. In an aspect, an occupant can have a linearity property of their spine in a sagittal plane and separately in a coronal plane. In an example, the side sleep support assembly 130a-c is configured to generate a comfortable side sleeping position by supporting linearity of the occupant's posture/spine in at least one of the sagittal plane and the coronal plane. In an aspect, the side sleep support assembly 130a-c allows a shoulder area of the occupant to deflect farther into the seatback 102 such that the spine of the occupant is allowed to move to a near straight-line, parallel alignment with a top surface of the seat 100 to achieve an ergonomic and comfortable side sleeping position (see FIGS. 4A-B).

In some implementations, in place of the recess 112, the surrounding seatback frame 110 has a void configured to accommodate the side sleep support assembly 130a-c. In some implementations, the side sleep support assembly 130a-c includes a control interface 134 with the seatback 102. In an example, the control interface 134 can be configured to actuate adjustable supports as discussed below.

Turning to FIG. 1A, the side sleep support assembly 130a is arranged within the recess 112 and can be secured to the surrounding seatback frame 110. In an example, the back portion 120 of the seatback frame 110 can include a securing edge 114a-b on each lateral side of the recess 112 and include a number of securing locations 116a-b along each lateral side of the securing edge 114a-b. In an example, each securing location 116a-b can align with and configured to be secured to a respective securing aperture 132, 212 along a lateral edge of the flexible diaphragm 150.

Figure 2A:
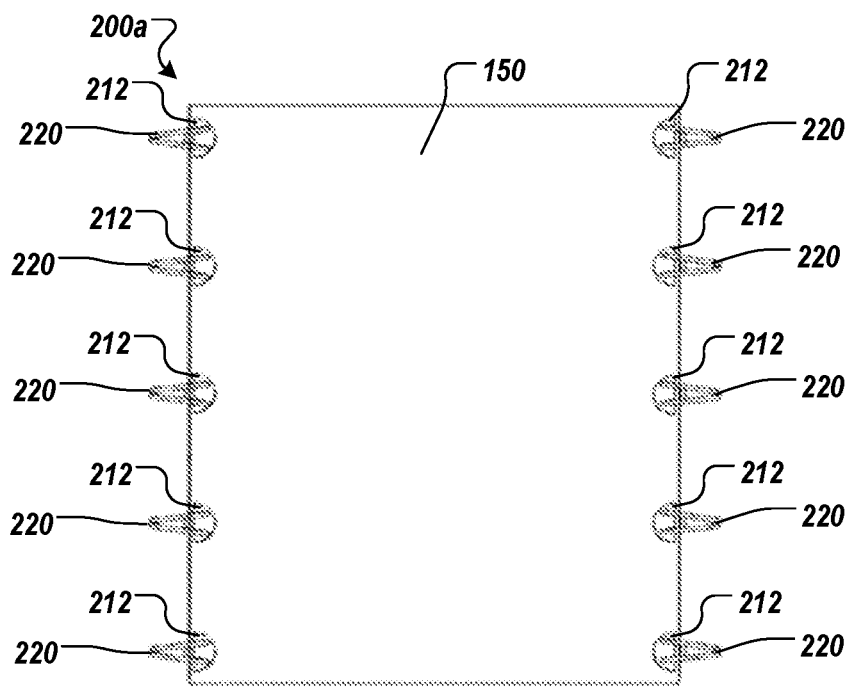
FIG. 2A illustrates a side sleep support assembly including a flexible diaphragm held in tension by a number of securing fasteners to a number of securing apertures on the flexible diaphragm according to an example.
Figure 2B:
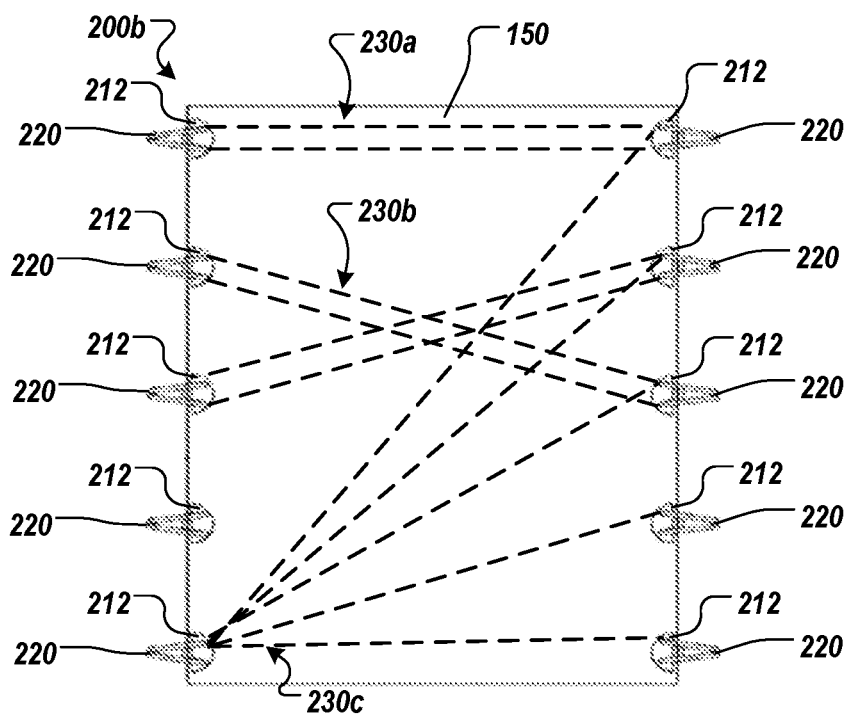
FIG. 2B illustrates a side sleep support assembly including a flexible diaphragm held in tension by a number of securing fasteners to a number of securing apertures on the flexible diaphragm, where each lateral fastener passes from a first securing aperture to a second securing aperture on an opposite side of the flexible diaphragm according to an example.
Figure 2C:
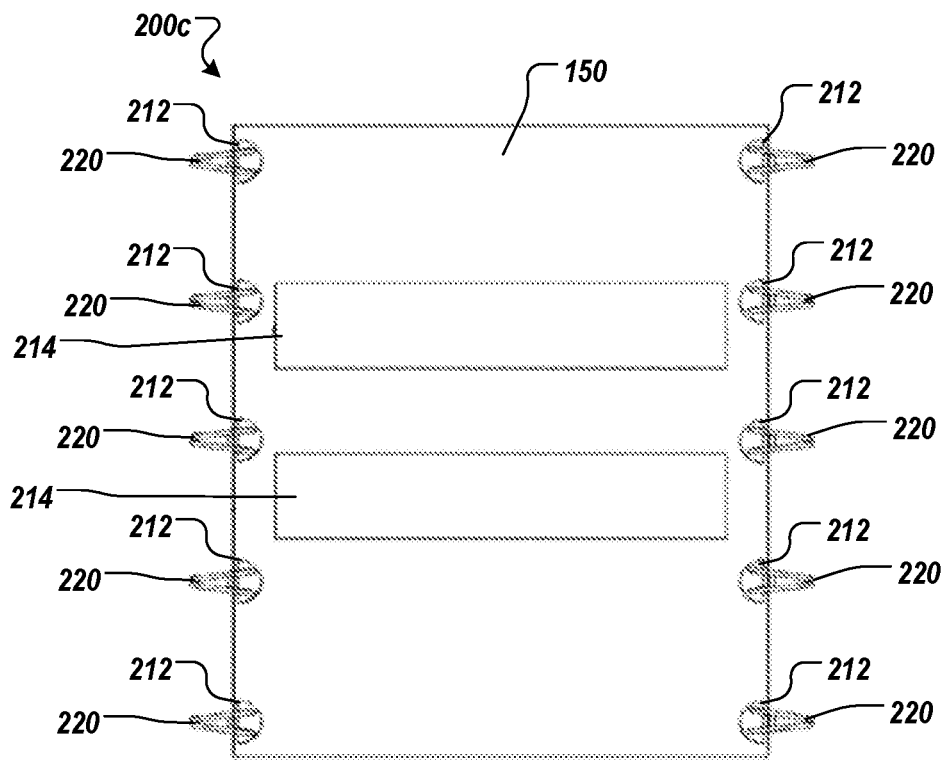
FIG. 2C illustrates a side sleep support assembly including a flexible diaphragm including a number of spaced attachment strips spaced in parallel alignment extending nearly a full width of the flexible diaphragm according to an example.
Figure 2D:
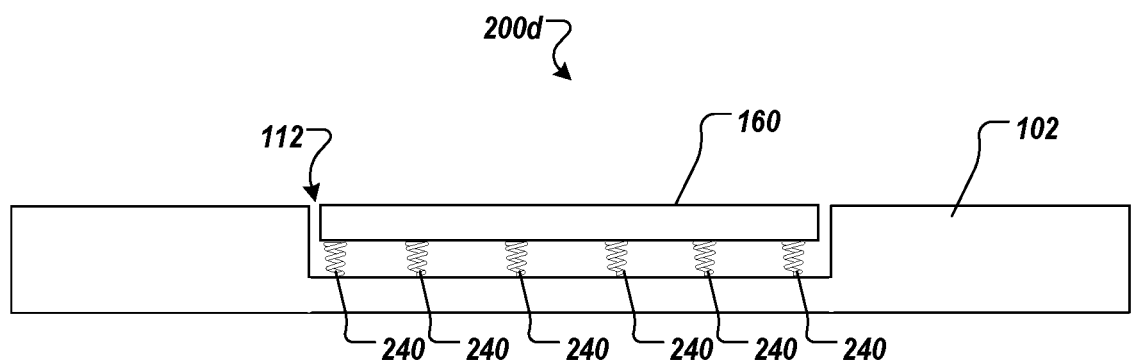
FIG. 2D illustrates a side sleep support assembly including a horizontally moving panel according to an example.
Figure 2E:
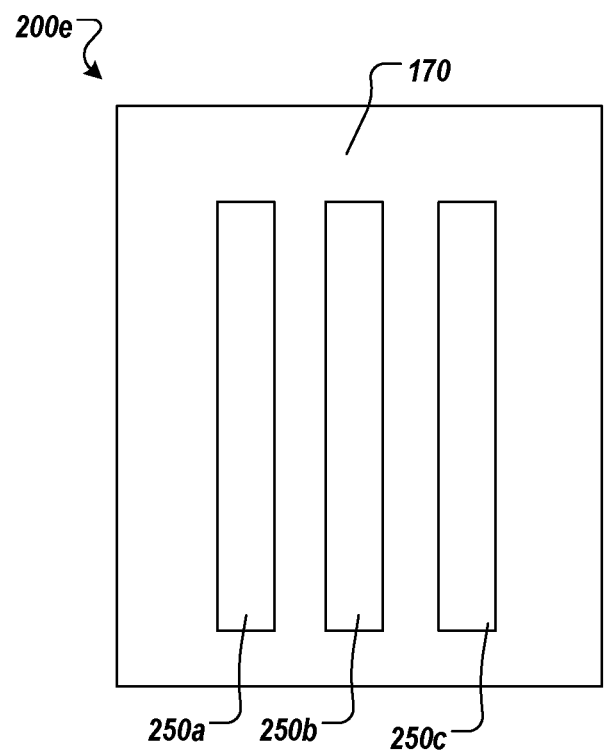
FIG. 2E illustrates a side sleep support assembly including an adjustable support and at least three elongate, horizontally-oriented adjustable baffles spaced in parallel alignment vertically extending nearly a full length of the adjustable support according to an example.
Figure 2F:
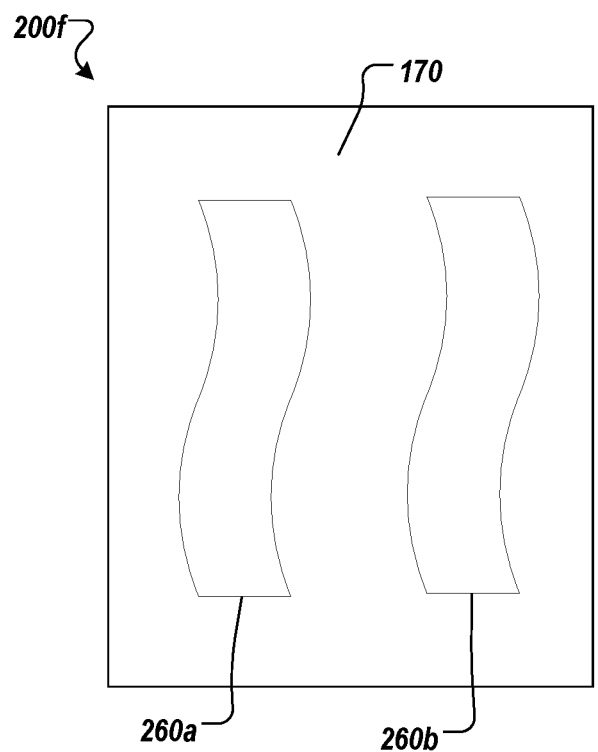
FIG. 2F illustrates a side sleep support assembly including an adjustable support and at least two elongate curved, horizontally-oriented baffles spaced in parallel alignment vertically extending nearly a full length of the adjustable support according to an example.

As shown in FIGS. 2A-2C, a side sleep support assembly 200a-c generally includes a flexible diaphragm 150 held in tension within a receiving region of a passenger seat, such as the recess 112 illustrated in FIG. 1A. The flexible diaphragm 150 may be composed of a flexible fabric such as a woven textile or canvas. In some embodiments, the flexible diaphragm is created using a synthetic webbing such as a nylon and/or polyester webbing. Although illustrated as a single contiguous piece, in some embodiments, the flexible diaphragm is composed of multiple strips of flexible material, such as bands of flexible straps.

The flexible diaphragm 150 can be held in tension using a number of lateral fasteners 220. The lateral fasteners 220, in some embodiments, connect to structural members of the passenger seat, such as side members of the seat back. In other embodiments, the lateral fasteners 220 connect to one or more frame members which, in turn, connect to structural members of the passenger seat. In this manner, the side sleep support assembly may be more easily removed and replaced from the passenger seat. For example, a frame may be fastened to the passenger seat frame with only a handful of connectors, such as two bolts per side of the seat back. The lateral fasteners 220, in some embodiments, include stretchable fasteners such as springs, elastic straps, and/or elastic ties. Stretchable fasteners, for example, may increase comfort by providing an initial weight-activated downward give in the flexible diaphragm 150. In some embodiments, the lateral fasteners 220 include non-stretchable straps, string, or ties. For example, the lateral fasteners 220 may be flexible or tensile materials. By providing non-flexible lateral fasteners 220, for example, loss of tautness/sagging over time may be avoided. In an example, each lateral fastener 220 can be configured to secure within a respective securing aperture 212 along a lateral edge of the flexible diaphragm 150. The lateral fasteners 220, in some embodiments, can include a shape memory material actuated using electricity or temperature. In an example, the shape memory material can be a nitinol wire configured to adjust an amount of tension. In an example, each lateral fastener 220 can be made from nitinol wire.

In other embodiments, rather than lateral fasteners 220, slots formed in the vertical edges of the seatback frame 110 adjacent the recess 112 may be configured to receive edge portions of the flexible diaphragm 150 to hold the flexible diaphragm 150 in a tensioned state. In some implementations, the flexible diaphragm 150 can be a woven or knitted elastic textile having bi-directional expansive elasticity in a warp and weft directions with return capacity. In other embodiments, the flexible diaphragm 150 may have unidirectional expansive elasticity (e.g., only along a lateral axis of the seat back or only along a horizontal axis of the seatback to create a "hammock" effect). The flexible diaphragm 150 is preferably durable and able to resist wear and tear from repeated use and stretch.

As shown in FIG. 2A, an example side sleep support assembly 200a includes a flexible diaphragm 150 held in tension within the recess 112. In an example, the tension between the flexible diaphragm 150 and the number of securing apertures 212 can be adjusted.

In some implementations, a respective lateral fastener 220 can pass through only the respective securing aperture 212 portion on the flexible diaphragm 150. In this example, no additional portions of the lateral fastener 220 span between opposite securing apertures 212 in a lateral direction. In other implementations, a respective lateral fastener 220 can pass from a first securing aperture 212 to a second securing aperture 212 on an opposite side of the flexible diaphragm 150 (FIG. 2B). In this example, the lateral fastener 220 can provide additional support in between opposite securing apertures 212 in the lateral direction. Further, the lateral fastener 220 can be woven into different designs to support the flexible diaphragm 150 according to an example. In some examples, the first securing aperture 212 can be connected to the second securing aperture 212 parallel on an opposite side of the flexible diaphragm (230a), at a diagonal on an opposite side of the flexible diaphragm (230b), and/or to more than one second securing apertures 212 opposite side of the flexible diaphragm (230c).

As shown in FIG. 2C, an example side sleep support assembly 200c includes a flexible diaphragm 150 and a number of spaced attachment strips 214 in parallel alignment extending nearly a full width of the flexible diaphragm 150. In an example, an adjustable support 170 can be secured to the attachment strips 214, where the adjustable support 170 (shown removed) can independently or cooperatively moved, inflated or deflated to control the degree of achievable deflection with the flexible diaphragm 150 in the side sleep support assembly 200c. In an example, the attachment strips 214 can be a Velcro™ strip, an adhesive, or any other securing method.

Turning to FIG. 1B, a seat 100b is shown including a seatback 102 having a recess 112 and a side sleep support assembly 130b including a horizontally moving panel 160 integrated into the recess 112 of the seatback 102 according to an example. In an example, the side sleep support assembly 130b can be arranged within the recess 112 and can be secured to the seatback frame 110. In an example, the back portion 120 of the seatback frame 110 can include a securing edge 114a-b on each lateral side of the recess 112 and include a number of securing locations 116a-b along each lateral side of the securing edge 114a-b. In an example, each securing location 116a-b can align with and configured to be secured to a respective securing aperture along a lateral edge of the horizontally moving panel 160.

As shown in FIG. 2D, an example side sleep support assembly 200d including a horizontally moving panel 160 can have a number of adjustable shocks 240 configured to connect the horizontally moving panel 160 to the seatback frame 110 within the recess 112. In an example, the horizontally moving panel 160 can be moved to control the degree of achievable deflection in the side sleep support assembly 200d.

Turning to FIG. 1C, a seat 100c is shown including a seatback 102 having a recess 112 and a side sleep support assembly 130c including an adjustable support 170 integrated into the recess 112 of the seatback 102 according to an example. In an example, the adjustable support 170 is configured to control shape and/or density of at least a portion of the side sleep support assembly 130c. In an example, the adjustable support 170 can be connected to a pneumatic pump through a valve assembly configured to inflate/deflate the adjustable support 170. In an example, the adjustable support 170 can be configured to fill a larger portion than the recess 112 up to and including the entire back portion 120 of the seatback 102.

As shown in FIGS. 2E-2F, in some implementations, the seat 100c can include a side sleep support assembly 200e-f including the adjustable support 170 and one or more adjustable baffles 250, 260 disposed over the adjustable support 170 and configured to control shape and/or density of at least a portion of the side sleep support assembly. The one or more adjustable baffles 250, 260, in some implementations, are connected to the adjustable support 170. For example, one or more of the adjustable baffles 250, 260 may be sewn or attached via an adhesive to the adjustable support 170. In other embodiments, the one or more adjustable baffles 250, 260 may be inserted into the adjustable support 170. For example, the adjustable support 170 may include a number of pockets for receiving the one or more adjustable baffles 250, 260.

In an example, the adjustable support 170 and each of the one or more adjustable baffles 250, 260 can be connected to a pneumatic pump through a valve assembly such that inflation/deflation of the one or more adjustable baffles 250, 260 can be conventionally controlled independently from another adjustable baffle 250, 260. In another example, a unity or grouping of the one or more adjustable baffles 250, 260 can be connected to a pneumatic pump through a valve assembly such that inflation/deflation of the unity or grouping of the one or more adjustable baffles 250, 260 can be conventionally controlled together. In another example, each baffle 250, 260 can be or include an electrical actuator connected to a power system such that activation of the electrical actuator can be electrically and precisely controlled. In an example, each baffle 250, 260 can include a dielectric elastomer actuator. In an aspect, the dielectric elastomer actuator can be flexible and configured to modify a shape of the adjustable support 170. In another example, each baffle 250, 260 can be a shape memory material actuated using electricity or temperature. In an example, the shape memory material can be a nitinol wire configured to adjust an amount of tension in each lateral fastener 220. In an example, each lateral fastener 220 can be made from nitinol wire.

In some embodiments, one or more of baffles 250, 260 can be or include a movable member or rod connected to the back portion 120 of the seat back 102 and may extend upward to cause modification of at least one of a shape and density of the adjustable support 170, cushion system, or other support. In one example, a rod including a flat (e.g., in-line with the surface of the passenger seat) surface and a rounded portion may be rotated such that the rounded portion pushes upwards from the seat back surface. In a second example, a curved or straight rod surface may be elevated above a planar surface of the passenger seat back. In this configuration, for example, one or more inflatable chambers may be disposed upon the rod.

Figure 7:
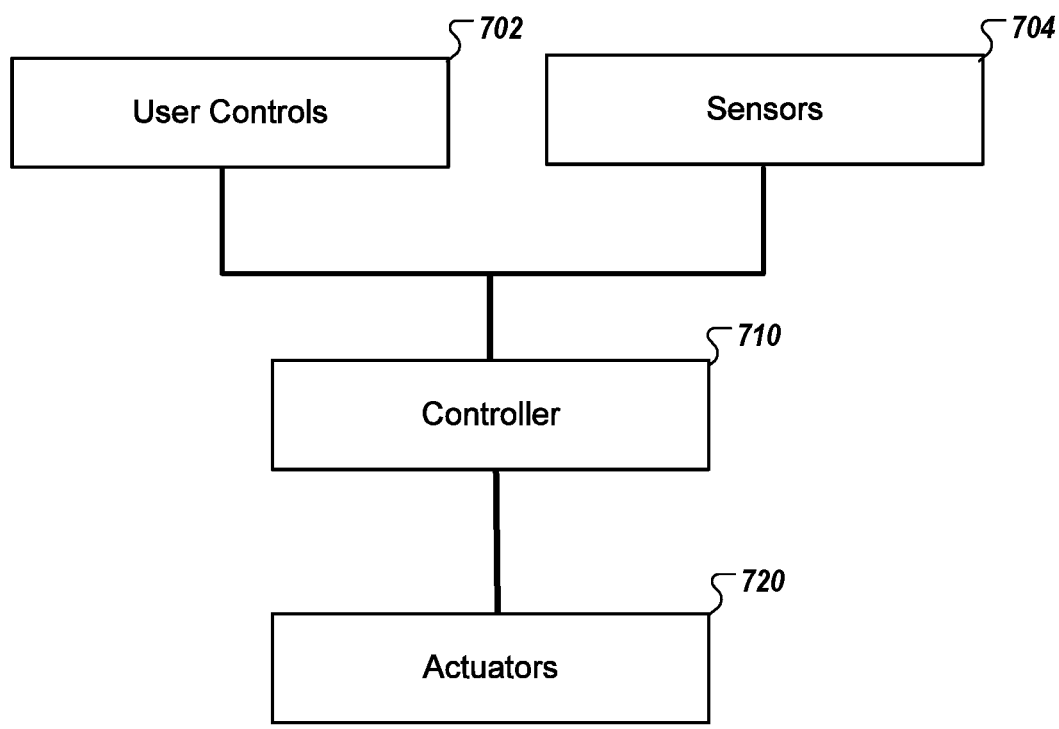
FIG. 7 illustrates a diagram of a control system configured to control a shape and/or density of the side sleep support assembly according to an example.

In an example, the seat can include a controller configured to control one or more actuators to modify a shape and/or density of the side sleep support assembly (see FIG. 7). In an example, the controller can be configured to alternate activation of the one or more adjustable baffles 250, 260 to avoid fatigue and pressure sores. In an example, the controller can be activated manually by one or more passenger controls configured to set a predetermined setting. In another example, the controller can be activated automatically based on an amount of pressure detected by one or more pressure sensors. In an example, a pressure sensor can be configured to detect pressure on one or more of the headrest, a portion of the side sleep support assembly, and the seat bottom. In an example, when the pressure sensor detects a pressure greater than a predetermined threshold, the controller can be configured to adjust the side sleep support assembly to adjust at least one of adjustable support 170 and the one or more adjustable baffles 250, 260.

In some embodiments, the seat includes or is proximate to an in-flight entertainment system, and the controller is part of the in-flight entertainment system. A user interface, for example, can be presented via a touch screen interface of the in-flight entertainment system. In other embodiments, the seat includes or is proximate to a controller such as a remote control including a number of buttons or controls for adjusting at least one of adjustable support 170 and the one or more adjustable baffles 250, 260. A dial, for example, may be surrounded by a number of selectable icons for identifying a desired support setting (e.g., soft, medium, or firm support, side-sleeping support, stomach-sleeping support, and/or back-sleeping support).

FIGS. 2E through 2F illustrate various example configurations of adjustable supports for use in a side sleep support assembly. Although various configurations are illustrated, in other embodiments, more or fewer support members may be included in the side sleep support assembly. Further, different combinations of positioning and orientation of side sleep support members are possible. With each of the below configurations of FIGS. 2E through 2F, a cushion system (as described below in relation to cushion system 320 of FIG. 3) including at least one layer of cushion can be disposed over the adjustable baffles 250 and the adjustable support 170. In implementations including rigid or semi-rigid support members such as an elevated support rod, the cushion system may be designed to soften the effect of the raised rod. In implementations including inflatable support members, the cushion system may be designed to increase comfort and softness upon and/or between inflatable support members. In some implementations, the cushion system can include a pneumatic foam, variable density foam, pneumatic cushion, and conventional foam.

As shown in FIG. 2E, an example side sleep support assembly 200e includes an adjustable support 170 and at least three elongate, horizontally-oriented adjustable baffles 250a-c spaced in parallel alignment vertically extending nearly a full length of the adjustable support 170. In an example, the adjustable baffles 250a-c can be independently or cooperatively moved and/or inflated or deflated to control the degree of achievable deflection in the side sleep support assembly 200e. In an example, a central baffle 250b can be inflated to support the spine of the occupant when they are laying on their back. In an example, at least one of the baffles 250a-c can be inflated to support a back of the occupant when they are laying on their side.

As shown in FIG. 2F, an example side sleep support assembly 200f includes an adjustable support 170, at least two elongate curved, horizontally-oriented baffles 260a-b spaced in parallel alignment vertically extending nearly a full length of the adjustable support 170. In an example, the adjustable baffles 260a-b can be independently or cooperatively inflated or deflated to control the degree of achievable deflection in the side sleep support assembly 200e. In an example, each baffle 260a-b can be inflated to support a curvature of the back of the occupant when they are laying on their side.

Figure 3:
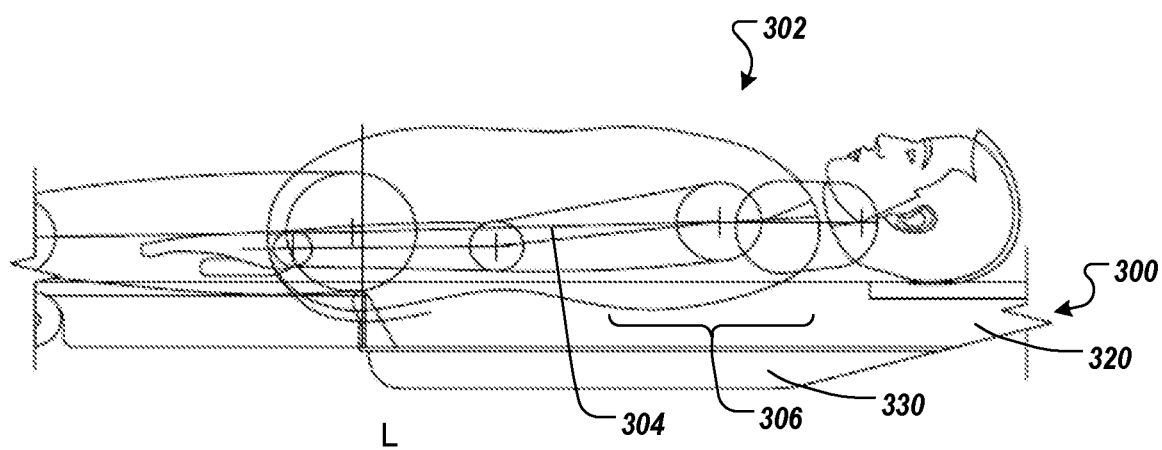
FIG. 3 is a side view of a passenger seat showing an integrated a side sleep support assembly within the seatback according to an example.

Turning to FIG. 3, further enhance comfort, in some implementations, a cushion system 320 can be continuous with the same cushion arrangement covering the seatback frame 110 and the side sleep support assembly. In an alternative embodiment, a portion of the cushion system 320 overlying the side sleep support assembly 130a-c can have a different construction from a portion of the cushion system 320 overlying the seatback frame 110. Differences in cushion system construction between each portion can include, but are not limited to, material types, foam types, foam density, numbers of layers, layered arrangement, types of layers, etc. In some implementations, a variable density and shaped cushion can be configured to have an integrated adjustable support 170 configured to be positioned over the recess 112. This variable density and shape cushion system be configured to change its density throughout using air flow control features as described for the adjustable support 170 (e.g., pneumatic pumps and control systems/valve blocks).

Regardless of continuity of the construction of the cushion system 320 overlying the seatback 102, a shape and/or density of the area of the cushion system 320 overlying the side sleep support assembly 130a-c can be controlled/adjusted according to one or more of passenger preference, pre-set triggers, seat position, seat controls, etc. For example, one or more of the adjustable baffles 250, 260 can be an inflatable air bladder, thereby filling to a degree the space between the cushion system 320 and the adjustable support 170 and/or the flexible diaphragm 150, in turn limiting deflection in the area of the side sleep support assembly 130a-c.

One of more of the adjustable baffles 250, 260 can be deflated, thereby vacating the space between the cushion system 320, the adjustable support 170 and/or the flexible diaphragm 150, in turn allowing additional deflection in the area of the side sleep support assembly 130a-c. Inflating/actuating the adjustable baffles 250, 260 can compress the overlying cushion system 320, thereby limiting deflection in the area of the side sleep support assembly 130a-c.

At least one of adjustable support 170 and the adjustable baffles 250, 260 can actuate/inflate/deflate to change the shape and/or density of the cushion system 320, thereby adjusting/controlling achievable deflection in the side sleep support assembly 130a-c. Changing the shape and/or density of the cushion system 320 can be triggered by one or more of sensors located in the seatback 102 and pre-programmed switches controlled via seat software. When needed, by design or demand, the shape and/or density of the cushion system 320 can be adjusted to provide additional deflection in the side sleep support assembly 130a-c to facilitate a more comfortable side sleeping position through spinal alignment.

FIG. 3 illustrates a side view of an occupant 302 laying on their back on a passenger seat 300 in a fully reclined position including an integrated side sleep support assembly 130 and a cushion system 320 according to an example. As illustrated, a shoulder area 306 of the occupant 302 is deflecting to a degree into the cushion system 320 within the seatback 102.

Figure 4A:
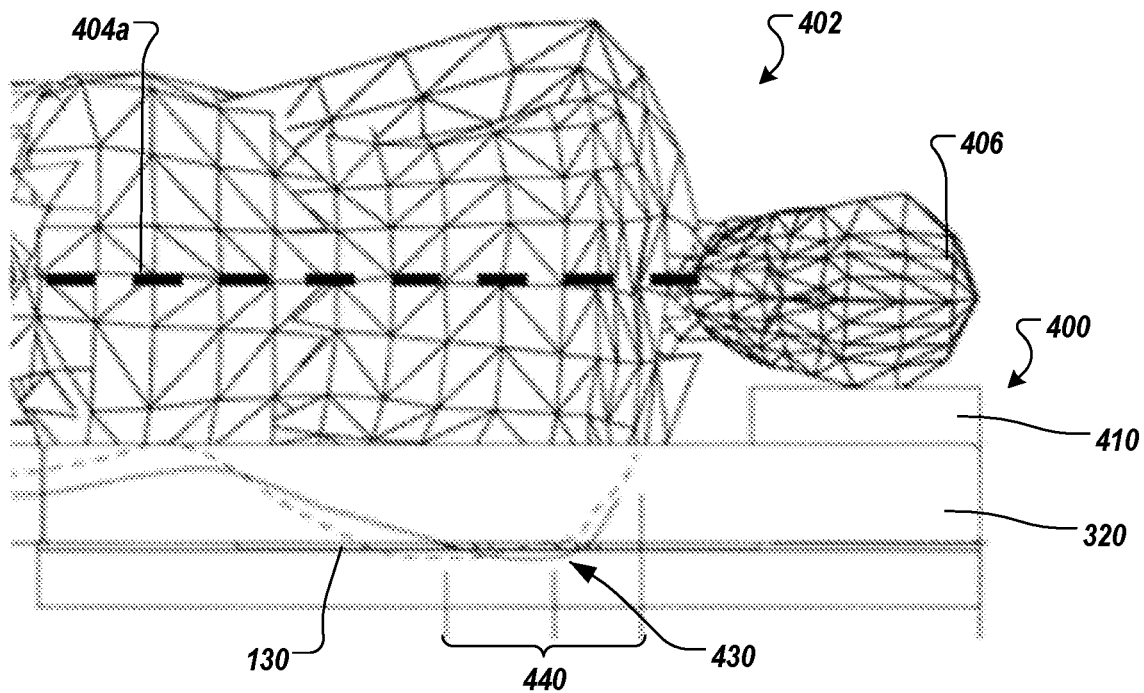
FIG. 4A is a side view of a passenger seat showing deflection in a seatback due to a shoulder area of an occupant laying in a sleeping configuration according to an example.
Figure 4B:
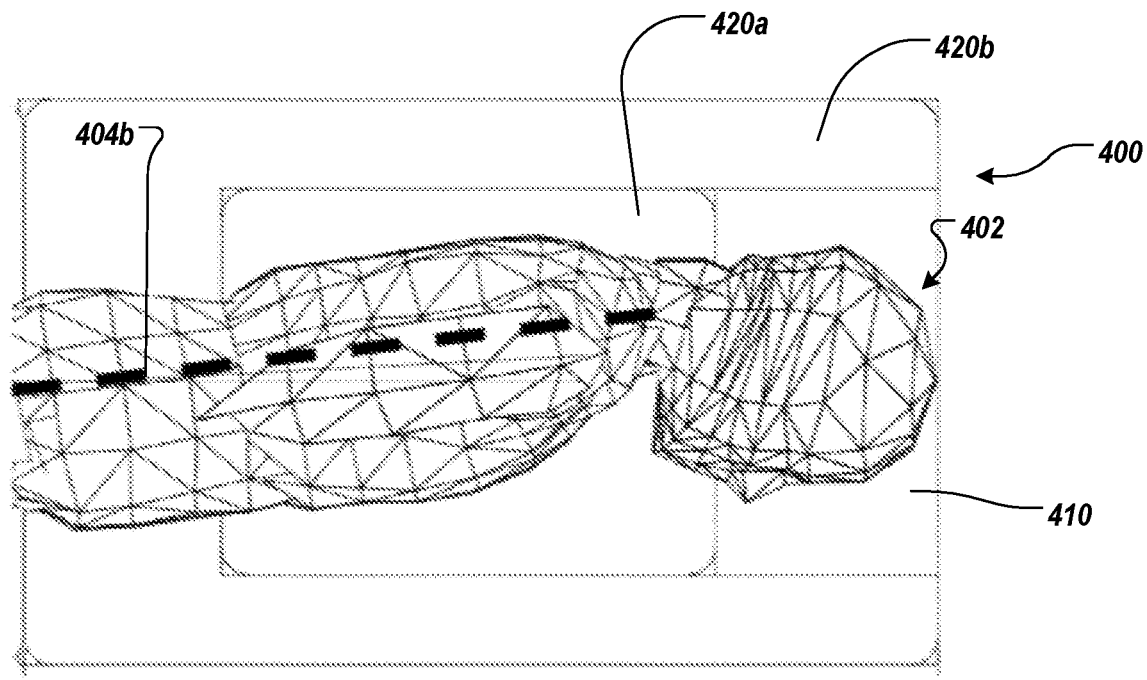
FIG. 4B is a top view of the passenger seat showing the occupant in a side sleeping position and a respective deflection area in a seatback of the passenger seat according to an example.

Turning to FIGS. 4A and 4B, a side and top view of the occupant 302 is illustrated laying on their side on the passenger seat 300 in the fully reclined position according to an example. Comparing FIG. 4A and FIG. 3 reveals the degree of deflection achievable in the seatback 102 depending on the sleeping position of the occupant 302 and setting/configuration of the side sleep support assembly 130a-c. Using line "L" as a reference, it is evident that the shoulder area 306 of the occupant 302 is able to deflect farther into the seatback 102 when the occupant 302 is lying on their side (see FIG. 4A) as compared to lying flat on their back (see FIG. 3). Although FIG. 3 is shown with a continuous seatback 102 from top to bottom, it is envisioned that, in some embodiments, the seatback 102 includes an elevated headrest 410 configured to elevate a head 406 of the occupant 402 and further straighten their spine 404a in a coronal plane. In some implementations, the seat can include a vertically and/or angularly adjustable headrest (see FIG. 6). In further implementations, the seatback 102 may include two or more segments, and the adjustable supports may be arranged upon multiple seatback segments.

Figure 5:
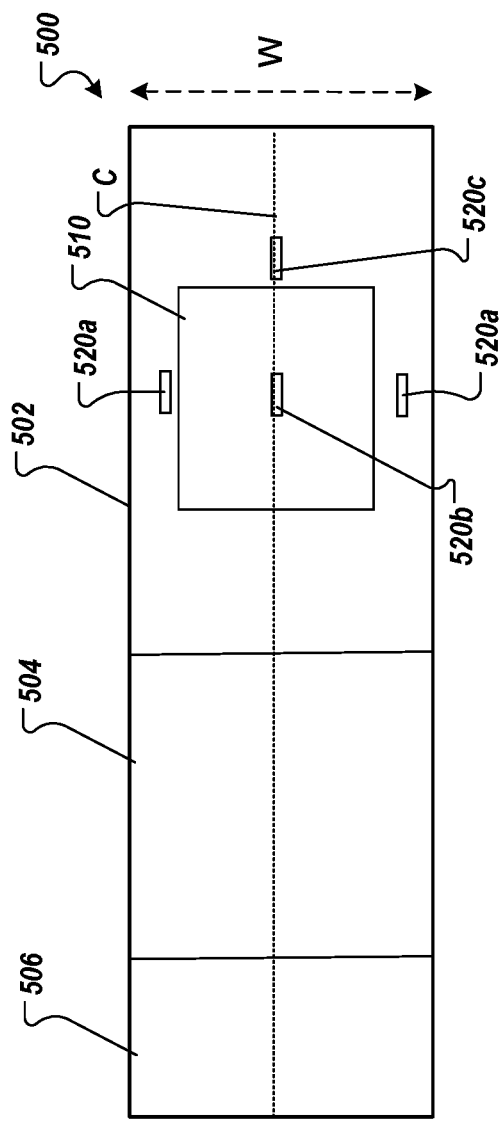
FIG. 5 is a top view of a passenger seat showing a position of a side sleep support assembly within the seatback according to an example.

FIG. 5 shows a seat 500 including a seat bottom 504, a legrest 506, and a side sleep support assembly 510 generally encompassing a center or middle portion of a seatback 502 of the seat 500 according to an example. In some implementations, the side sleep support assembly 510 can encompass about half of a total width of the seatback 502, less than half of the total width of the seatback 502, more than half of the total width of the seatback 502, the majority of the total width of the seatback 502, a small percentage of the total width of the seatback 502, etc., with the width of the side sleep support assembly 510 indicated as "W". Similar portions can also apply to a total vertical height of the seatback 502. Further, as mentioned earlier, in circumstances involving a seatback having multiple segments, the side sleep support assembly may be distributed upon multiple seat back segments.

In an example, the side sleep support assembly 510 can be disposed generally in a center C of a width of the seatback 502 in a general area of an upper torso and shoulder area 440 of a seat occupant 302 lying on their side on the seatback 502. In another example, the side sleep support assembly 510 can be disposed substantially off-center of a width of the seatback 502 in the general area of the upper torso and shoulder area 440 of the occupant 302 lying on their side on the seatback 502. In an aspect, a position of the side sleep support assembly 510 is disposed substantially off-center of the seatback 502 in order to accommodate the occupant 302 lying on their side off-center on the seatback 502.

In some implementations, the seat 500 can include one or more sensors 520a-c. In an example, the seat 500 can include one or more sensors 520a positioned on a lateral side of the seatback 502. In an example, the seat 500 can include one or more sensors 520b positioned on within the side sleep support assembly 510. In an example, the seat 500 can include one or more sensors 520c positioned on a central portion of the seatback 502. In an example the one or more sensors 520a-c can be used to determine when the occupant is seated in a side position. In an example, a uniform pressure across the sensors 520a positioned on the lateral sides of the seatback 502 can indicate the passenger is sitting or lying on their back. In an example, when the one or more sensors 520b positioned on within the side sleep support assembly 510 and the one or more sensors 520c positioned on the central portion of the seatback 502 indicate a higher pressure than at least one of the sensors 520a positioned on the lateral sides of the seatback 502, the controller can determine that the passenger is sitting or lying on their side. In an example, based on the sensed passenger position, the controller can be configured to actuate/inflate/deflate to change the shape and/or density of at least one of adjustable support 170 and the adjustable baffles 250, 260, thereby adjusting/controlling achievable deflection in the side sleep support assembly 130a-c.

Adjustable Headrest

Figure 6:
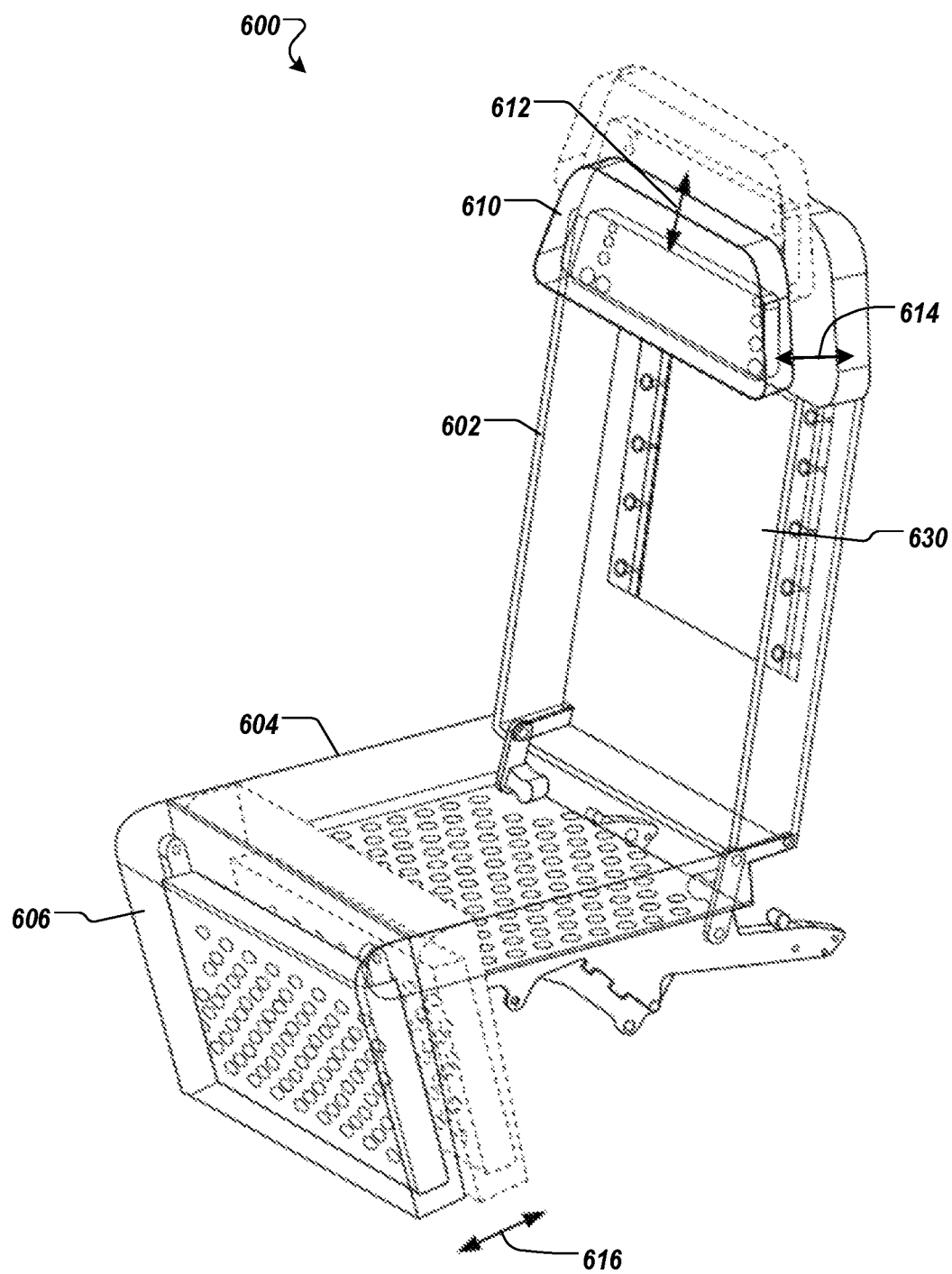
FIG. 6 is an isometric view of a lay-flat capable passenger seat having an adjustable headrest and a side sleep support assembly integrated into a seatback according to an example.

FIG. 6 shows a seat 600 having an integrated side sleep support assembly 630 including a flexible diaphragm 150 and cushion system (not shown) without intermediate adjustable supports. In this arrangement, greater inward deflection can be achieved in the area of the flexible diaphragm 150 as compared to the surrounding rigid seatback frame 110. Thus, the seatback 102 can have some deflection when the occupant is lying flat on their back, and greater deflection when the occupant is lying on their side in a side sleeping position. The amount of achievable deflection can be customized based on the materials chose to construct the flexible diaphragm 150 and the cushion system 320.

In some implementations, the seat 600 can include a vertically and/or angularly adjustable headrest 610. In one aspect, the adjustable headrest 610 can translate relative to the seatback 102 based on passenger preference, seatback orientation, pre-set triggers, etc. In an example, the adjustable headrest 610 can further be configured to move toward or apart from the seatback 102 along a length of the seatback 102 (612). In an example, the adjustable headrest 610 can further be configured to move toward or apart from the seatback 102 parallel to the seatback 102 (614). In some implementations, the side sleep support assembly 630 can include a flexible diaphragm having one or more adjustable supports configured to support posture of the occupant and further straighten their spine in a sagittal plane. In an aspect, the side sleep support assembly may compensate to adjust the adjustable headrest 610 to further straighten the spine and avoid putting strain on a neck and head of the occupant. Each occupant may have a substantially different head to shoulder distance.

In some implementations, the adjustable headrest 610 can include a pressure sensor configured to detect an amount of pressure the head of the occupant is placing on the adjustable headrest 610. In an example, the controller can be configured to adjust the one or more adjustable baffles 250, 260 based on a reading of the pressure sensor.

The seat 600 can include additional features such as extendable seat bottom 604, angularly adjustable legrest 606, lumbar support, etc. In an example, the extendable seat bottom 604 can be configured to adjust a length of the seat bottom (616). In an aspect, slightly adjusting the length of the seat bottom relative to the seat back can reduce stress on the spine of the occupant.

FIG. 7 illustrates a diagram of a control system 700 configured to control a shape and/or density of the side sleep support assembly according to an example. In an example, the control system 700 can include a controller 710 configured to receive input from at least one of user controls 702 and one or more sensors 704. In an example, the user controls 702 can be a button on a seat or a user interface presented via an interface of the in-flight entertainment system. In an example, the one or more sensors 704 can include one or more pressure sensors configured to sense an amount of pressure placed on one or more of the headrest, the side sleep support assembly, and the seat bottom. The controller 710 is configured to control the one or more actuators 720 to adjust at least one of the adjustable support 170 and the one or more adjustable baffles 250, 260 based on the input received from at least one of the user controls 702 and/or the one or more sensors 704.

In addition, at least one of the adjustable support 170 and the one or more adjustable baffles 250, 260 may cause articulation of components of the seat 100 in response to a control signal received from a controller that receives inputs from a passenger at an interface for an input/output (I/O) device proximate the seat 100 and/or a cabin attendant at an I/O device at a flight attendant station. In some implementations, the I/O device (not shown) may be a control panel with buttons and/or a touchscreen positioned at an armrest or monitor forward of the seat 100 that allows a passenger to select a desired position for the seat 100. In response to receiving the selected position, the controller may issue control signals to the at least one of the adjustable support 170 and one or more adjustable baffles 250, 260 to cause coordinated articulation of the actuator-controlled components of the seat 100. In some implementations, side sleep support may be deactivated by the controller 710 (e.g., supports stowed and/or deflated) upon movement of the passenger seat out of the lie-flat position. Further, in the event of an emergency situation (e.g., rapid deceleration, heavy turbulence, etc.), a master controller (e.g., in communication with the flight attendant station or another controller) may issue commands to the controller 710 causing the seat 100 and other seats positioned within the cabin to automatically return to a TTOL position including emergency-sanctioned positions of the support members.

Figure 8:
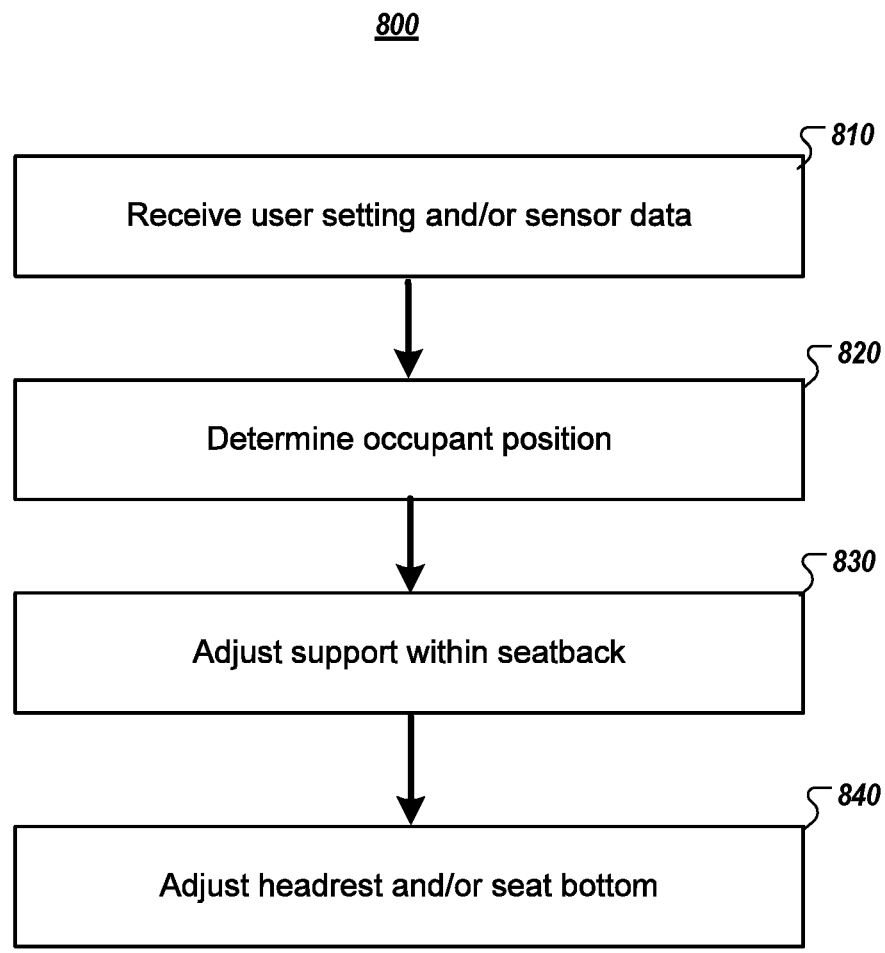
FIG. 8 is a flowchart describing a method for facilitating a side sleeping position according to an example.

FIG. 8 is a flowchart describing a method 800 for facilitating a side sleeping position according to an example. The method 800, for example, may be performed by the controller 710 of FIG. 7.

In some implementations, the method 800 begins with receiving at least one of a user setting and sensor data (810). In an example, the user setting can be an input from the user controls 702 and the sensor data can be provided from the one or more sensors 704.

In some implementations, an occupant position is determined based on the at least one of the user setting and the sensor data (820). An example of determining the occupant position includes comparing sensor readings from the one or more sensors 520a-c, 704.

In some implementations, at least one support within the seatback is adjusted (830). Examples of adjusting at least one support within the seatback includes controlling the controller 710 to control the one or more actuators 720 to adjust at least one of the adjustable support 170, the one or more adjustable baffles 250, 260, and the horizontally moving panel 160. For example, the actuators 720 may adjust an orientation of one or more of the adjustable supports, cause inflation of one or more of the adjustable baffles, and/or cause deflation of one or more of the adjustable baffles, as well as modify a position of the horizontally moving panel 160.

In some implementations, at least one of a headrest position and a seat bottom position is adjusted (840). For example, for proper spine alignment, the headrest may be raised, lowered, and/or adjusted in height. Further, the seat bottom may be extended.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An aircraft passenger seat configured to facilitate ergonomic alignment of an occupant, the aircraft passenger seat comprising:
   a seat bottom; and
   a seatback comprising:
      a seatback frame;
      a back portion at least partially surrounded by the seatback frame, the back portion defining a recess having two lateral sides, and the back portion including a respective edge at each of the two lateral sides of the recess; and
      a sleep support assembly mounted to the back portion and spanning at least the recess, the sleep support assembly including:
         an adjustable support member configured for at least one of translation and deformation;
         at least one actuator configured to cause at least one of the translation and deformation of the adjustable support member; and
         a controller configured to actuate the at least one actuator;
   wherein, the seatback has at least an upright position in which the seatback is at angle to the seat bottom and a reclined position in which the seatback is aligned with the seat bottom, and wherein the controller, when the seatback moves to the reclined position, actuates the at least one actuator to cause the adjustable support member to at least one of translate and deform to receive a shoulder of a side lying occupant of the aircraft passenger seat at a great depth, thereby facilitating ergonomic spinal alignment.

2. The passenger seat according to claim 1, wherein the adjustable support member comprises a diaphragm; and wherein the sleep support assembly further includes a plurality of fasteners attaching the diaphragm, at each of the two lateral sides of the recess, to a respective edge of the back portion, the plurality of fasteners applying tension to the diaphragm.

3. The passenger seat according to claim 2, wherein the diaphragm is a fabric diaphragm.

4. The passenger seat according to claim 2, wherein the at least one actuator is configured to cause adjustment of one or more of the plurality of fasteners to cause the adjustable support member to at least one of translate and deform.

5. The passenger seat according to claim 4, wherein:
   the controller is configured to cause adjustment of at least one of the plurality of fasteners through signals issued to the at least one actuator; and
   wherein, when the seatback is in the reclined position, the controller is configured to control at least one of shape and density of the sleep support assembly through actuation of the at least one actuator for supporting ergonomic alignment of a spine of an occupant of the aircraft passenger seat.

6. The passenger seat according to claim 5, wherein the sleep support assembly further comprises: at least one pressure sensor configured to detect an amount of pressure an occupant is placing on one or more regions of the seatback; wherein the controller is configured to adjust the plurality of fasteners based on signals received from the at least one pressure sensor.

7. The passenger seat according to claim 6, further comprising an adjustable headrest, wherein: the at least one pressure sensor comprises a headrest-mounted pressure sensor configured to detect an amount of pressure a head of an occupant is placing on the headrest; and the controller is configured to adjust the headrest based on signals received from the headrest-mounted pressure sensor.

8. The passenger seat according to claim 1, wherein the sleep support assembly further comprises an inflatable bladder configured to inflate, thereby modifying a contour of at least one of the adjustable support member and a surface of the seatback.

9. The passenger seat according to claim 1, wherein the sleep support assembly further comprises at least one support configured to support a spine of an occupant at the reclined position of the seatback.

10. The passenger seat according to claim 1, wherein the adjustable support member comprises a panel connected to the seatback using a plurality of spring members, wherein, in the reclined position of the seatback, the plurality of spring members are configured to allow displacement of the panel toward a floor of an aircraft cabin.

11. The passenger seat according to claim 10, wherein the plurality of spring members comprise a plurality of adjustable shocks.

12. The passenger seat according to claim 1, further comprising a cushion assembly disposed between a portion of a surface of the seatback and the sleep support assembly.

13. The passenger seat according to claim 1, wherein the adjustable support member is generally rectangular in shape.

14. A system for facilitating ergonomic positioning of a passenger in a lie-flat position of a passenger seat, the system comprising:
   a passenger seat comprising:
      a seat bottom;
      a seat back including:
         a seatback frame;
         a back portion at least partially surrounded by the seatback frame, the back portion defining a recess having two lateral sides, and the back portion including a respective edge at each of the two lateral sides of the recess; and
         a sleep support assembly mounted to the back portion and spanning at least the recess, the sleep support assembly including:
            an adjustable support member configured for at least one of translation and deformation:
               at least one actuator configured to cause at least one of the translation and deformation of the adjustable support member; and
               a controller configured to actuate the at least one actuator;
            wherein, the seatback has at least an upright position in which the seatback is at an angle to the seat bottom and a reclined position in which the seatback is aligned with the seat bottom, and wherein the controller, when the seatback moves to the reclined position, actuates the at least one actuator to cause the adjustable support member to at least one of translate and deform to receive a shoulder of a side-lying occupant of the aircraft passenger seat at a great depth, thereby facilitating ergonomic spinal alignment.

15. The system of claim 14, wherein the controller comprises circuitry configured to receive at least one of a user setting and sensor data; and
responsive to the at least one of the user setting and the sensor data, control the at least one actuator to adjust the adjustable support member.

16. The system of claim 15, wherein:
the sleep support assembly comprises at least one pressure sensor configured to detect pressure an occupant applies to one or more regions of the seat back; and
receiving the at least one of the user setting and the sensor data comprises receiving signals from the at least one pressure sensor.

17. The system of claim 15, wherein the controller is further configured to, based on the signals from the at least one pressure sensor, determine a position of an occupant,
wherein controlling the one or more actuators comprises adjusting at least one inflatable member to support ergonomic alignment of a spine of an occupant.

18. The system of claim 14, further comprising a user interface including a plurality of user-selectable controls, wherein each of the plurality of user-selectable controls are configured to cause actuation of a portion of the at least one actuator.

19. The system of claim 14, wherein the adjustable support member comprises a fabric held in tension across the recess.

* * * * *